United States Patent
Richards et al.

(10) Patent No.: US 6,690,531 B2
(45) Date of Patent: Feb. 10, 2004

(54) DYNAMIC TAPE PATH ADJUSTMENT

(75) Inventors: Durkee B. Richards, Stillwater, MN (US); James S. Anderson, Chanhassan, MN (US); Leif O. Erickson, River Falls, WI (US)

(73) Assignee: Imation Corp., Oakdale, MN (US)

( * ) Notice: Subject to any disclaimer, the term of this patent is extended or adjusted under 35 U.S.C. 154(b) by 326 days.

(21) Appl. No.: 09/747,598

(22) Filed: Dec. 22, 2000

(65) Prior Publication Data

US 2002/0080514 A1 Jun. 27, 2002

(51) Int. Cl.$^7$ .............................................. G11B 5/596
(52) U.S. Cl. ................. 360/72.02; 360/77.12; 360/78.02
(58) Field of Search ..................... 360/72.1, 76.185, 360/95, 77.12, 78.02, 76, 130.21; 226/15; 242/324

(56) References Cited

U.S. PATENT DOCUMENTS

| | | | |
|---|---|---|---|
| 2,938,962 A | * 5/1960 | Konins et al. | 360/76 |
| 4,058,841 A | * 11/1977 | Kishi et al. | 360/27 |
| 4,392,163 A | * 7/1983 | Rijckaert et al. | 360/76 |
| 4,675,760 A | * 6/1987 | Stadelmann et al. | 360/77.14 |
| 4,875,127 A | * 10/1989 | McClure | 360/130.21 |
| 5,333,770 A | * 8/1994 | Kano et al. | 226/15 |
| 5,379,165 A | * 1/1995 | Pahr | 360/78.02 |
| 5,737,003 A | 4/1998 | Moe et al. | |
| 5,901,011 A | * 5/1999 | Chae et al. | 360/85 |
| 5,946,156 A | 8/1999 | Schwarz et al. | |
| 5,978,003 A | 11/1999 | Brenner, Jr. | |
| 6,067,213 A | * 5/2000 | Oldermann et al. | 360/130.21 |
| 6,118,630 A | 9/2000 | Argumedo | |
| 6,131,840 A | 10/2000 | Ukai et al. | |

* cited by examiner

Primary Examiner—David Hudspeth
Assistant Examiner—K. Wong
(74) Attorney, Agent, or Firm—Eric D. Levinson

(57) ABSTRACT

Data recording tape is passed along guides and past a read/write head. Sensors detect the position of the tape and adjust the guides and the head as a function of the position. If the tape deviates from the target tape path, a controller moves a guide to steer the tape back to the target tape path, using the sensor signals. In cases of tape disturbance such as those involving rapid tape motion, an adaptive estimator uses the sensor signals to position the head to anticipate the expected position of the tape when the disturbance arrives at the head.

36 Claims, 4 Drawing Sheets

DYNAMIC TAPE PATH ADJUSTMENT

TECHNICAL FIELD

This invention relates to equipment used in electronic media reading and writing, and more particularly to systems using data recording tape.

BACKGROUND

Tape read/write head assemblies include one or more read/write transducer heads positioned transverse to the intended path of a recording tape. The transducer heads write data on and read data from parallel tracks on the tape called "data tracks." The head assembly can move laterally across the width of the tape to position a particular transducer head relative to a particular data track, with the head assembly's position controlled by a servo.

The tape itself may include tracks called "servo tracks," which provide information to control the lateral position of the head assembly. Servo tracks serve as reference features or guide marks on the tape. By monitoring the position of the head assembly relative to the servo tracks, the head assembly can dynamically adjust the position of the transducer heads to keep the heads in a correct position relative to the tape tracks. Ideally, the tape path past the head assembly should not vary, but in practice lateral tape movement affects the position of a transducer head relative to a track. Dynamic repositioning is important because it compensates for the lateral movement.

In part because of servo control, data track widths have been made significantly narrower and the capacity of the recording medium has been increased. With a decrease of the width of data tracks and an increase of the number of tracks on a width of tape, servo control takes on added significance and greater precision is advantageous. The position of the transducer heads of the head assembly relative to tape tracks can become sensitive to a variety of disturbances, some of them minute.

Disturbances may arise, for example, from the equipment used to dispense the tape that is being fed past the transducer heads and from the equipment used to take up the tape after it had passed the transducer heads. In a typical case, for example, tape is dispensed from a first reel, which includes a hub and which often includes a flange, and is taken up by second reel. If a hub or a spindle supporting a reel is not perpendicular to the reel, the reel may wobble as it rotates. This wobble causes the tape to move laterally relative to the head assembly.

In addition, contact between the tape edge and the flange may produce lateral movement of the tape. When tape is taken up on a reel at high speed, for example, small pockets of air may become trapped between layers of tape, allowing one layer to slip laterally relative to another. Another potential source of lateral tape motion may come about due to the interaction between the head assembly and the tape. At times when the head assembly moves laterally relative to the tape to find a particular track, friction between the head assembly and the tape causes the tape to adhere to the head assembly and "follow" the head assembly.

Some of the lateral movements described above involve rapid changes in the lateral position of the tape relative to the head assembly, and other movements involve gradual changes. In the case where the tape follows the moving head assembly, for example, the initial tape movement may be gradual. There may come a point, however, at which the tension in the tape overcomes the frictional force, and the tape rapidly snaps back to a previous position.

SUMMARY

The invention provides systems that sense the lateral movement of data recording tape such as magnetic recording tape. One system monitors the tape position and adjusts the tape path based upon the tape position. Another system monitors the tape position and adjusts the position of the head assembly. The systems will be described separately, but typically the systems cooperate with each other to compensate for rapid (or "high-frequency") changes and for more gradual (or "low-frequency") changes in tape position.

In one embodiment, the present invention provides a system for positioning data recording tape. The system includes a sensor that detects the position of the tape and issues a position signal as a function of the tape position. The sensor may be, for example, an optical sensor or a magnetic sensor, and the signal may indicate how close the tape is to a target tape path. The system also includes a guide that interacts with the tape and a controller that moves the guide as a function of the position signal. By moving, the guide steers the tape. One technique for steering the tape with the guide is by tilting the guide.

In another embodiment, the present invention presents a system for positioning a head for reading and writing to data recording tape. The system includes a head, a sensor configured to detect the position of the tape and generate a signal as a function of the position, and a servo coupled to the head. The servo is configured to move the head as a function of the signal. Typically the sensor is located such that the sensor detects the tape's position before the tape passes the head. The system may also include an adaptive estimator, which receives the signal. Based upon the detected position or movement of the tape, the adaptive estimator may generate a second signal, which is used by the servo to move the head. With this system, the servo may move the head in anticipation of a disturbance that has not yet reached the head.

In a further embodiment, the present invention provides a method for steering data recording tape. The method includes passing the tape over a guide, sensing the position of the tape, generating a signal as a function of the position, and moving the guide as a function of the signal.

In still another embodiment, the present invention provides a method for moving the head in anticipation of tape disturbances. The method comprises detecting a disturbance in the path of the tape before the disturbance reaches the head, generating a signal as a function of the disturbance, and moving the head as a function of the signal.

In an additional embodiment, the present invention presents a system that includes a sensor that detects the position of data recording tape and issues a position signal as a function of the position of the tape. The system also includes a guide that interacts with the tape, a first controller that moves the guide as a function of the position signal, a head and a second controller that moves the head as a function of the position signal. The controllers may send signals to each other.

In a further embodiment, the present invention presents a control method. The method includes passing data recording tape over a guide and past a head. The position of the tape is sensed, and a position signal is generated as a function of the position of the tape. The method further includes moving the guide as a function of the position signal and moving the head as a function of the position signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
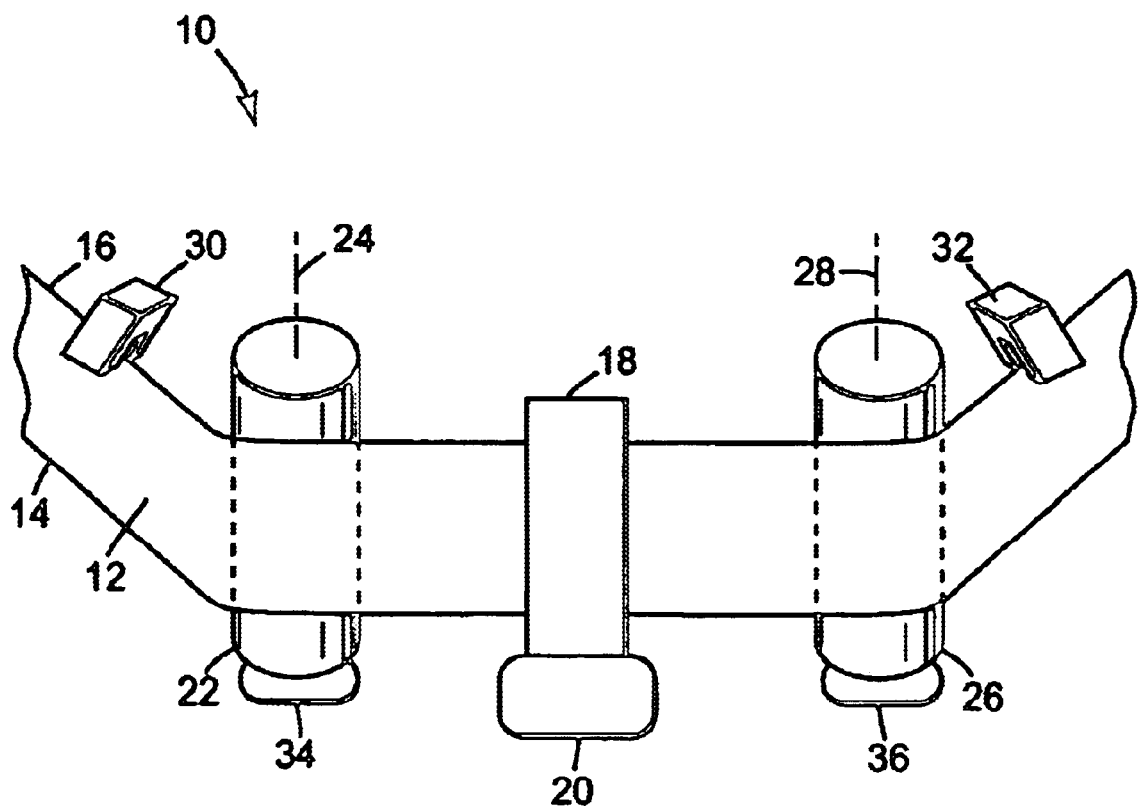
FIG. 1 is a diagram of a tape guiding system.

FIG. 1 shows a system 10 that guides a tape 12 past a read/write head 18. Tape 12 includes a lower edge 14 and an upper edge 16. Tape 12 is dispensed from some apparatus such as a first reel (not shown in FIG. 1), and is taken up by other apparatus such as a second reel (not shown in FIG. 1). Tape 12 may travel past read/write head 18 from right to left or from left to right. When tape 12 is moving from left to right, tape 12 is dispensed and passes over a first guide 22. Tape 12 then passes head 18. Tape 12 passes over a second guide 26 before being taken up.

Head 18 moves up and down, allowing head 18 access to different tracks on tape 12. The position of head 18 is governed by a head servo 20, which is controlled by a servo controller (not shown in FIG. 1). In the example of FIG. 1, head 18 is a magnetic head that reads data from and writes data to tape 12, which is magnetic recording tape. In other embodiments, however, head 18 and tape 12 may be arranged for optical recording.

Guides 22 and 26 stabilize tape 12 as tape 12 moves past head 18, and guides 22 and 26 maintain tape 12 in or near the "target," or desired, tape path. Guides 22 and 26 steer tape 12 in a manner to be described in more detail below. Guides 22 and 26 may be roller guides with smooth cylindrical surfaces and have a low coefficient of friction with tape 12. Guides 22 and 26 may rotate about axes 24 and 28, respectively. Alternatively, guides 22 and 26 may be fixed, with tape 12 sliding over the guides or tape 12 flying on entrained air over the guides. As shown in FIG. 1, guides 22 and 26 do not include flanges to guide tape edges 14 and 16. Interaction between tape edge 14 or tape edge 16 and a flange tends to cause damage to the edge and affects the quality of the edge. Optionally, guides 22 and 26 could have flanges, with the flanges being removed from the tape path. The flanges would not serve to steer tape 12 during ordinary operation, but would serve as a safety feature to prevent tape 12 from slipping off guides 22 and 26 in rare cases of extreme tape movement.

Tape 12 may be housed, for example, in a tape cartridge. Some components of system 10, including components described below, may be included in the tape cartridge. Alternatively, some components may be included in a tape drive that receives the cartridge and runs tape 12 past head 18. Guides 22 and 26, for example, may be mounted on a baseplate in the tape cartridge, or guides 22 and 26 may be mounted on a deck within the tape drive. The invention is intended to encompass system 10 without regard to whether its components are included in the cartridge, the driver, or any combination thereof.

Guides 22 and 26 are movable, with axes 24 and 28 being configured to change orientation. A first guide actuator 34 regulates the orientation of axis 24, and consequently regulates the orientation of first guide 22. Similarly, a second guide actuator 36 regulates the orientation of axis 28 and consequently regulates the orientation of second guide 28. Guide actuators 34 and 36, by regulating the orientation of guides 22 and 26, can cause one or both guides to tilt relative to an axis substantially perpendicular to a tape drive deck across which tape 12 is moved.

Figure 2:
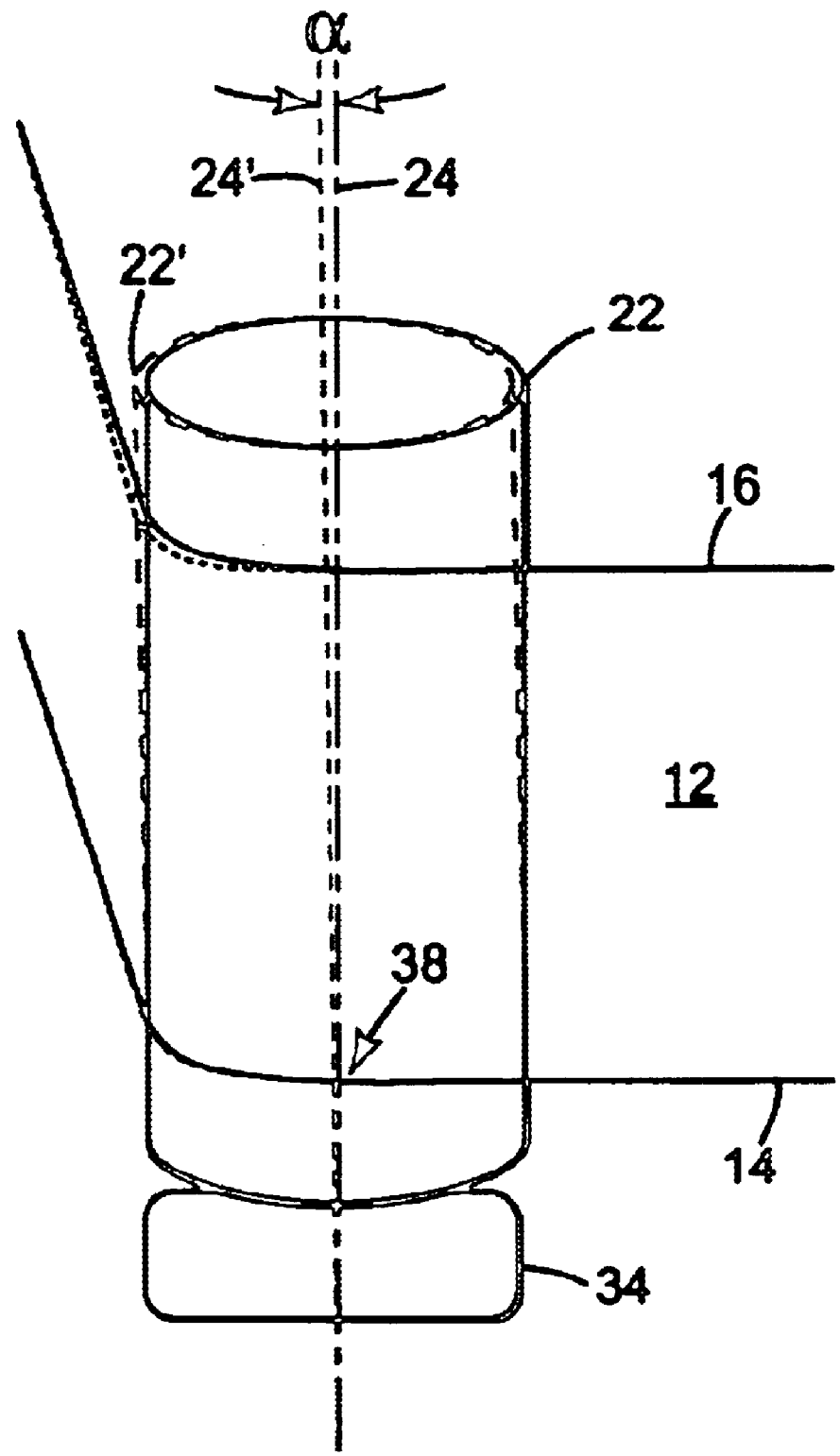
FIG. 2 is a diagram of a movable tape guide.

Tilting of a guide changes the path of tape 12, as illustrated in FIG. 2. FIG. 2 shows first guide actuator 34 tilting axis 24 by an angle $\alpha$ to a tilted position 24', causing guide 22 to move to a new position 22'. In the example in which guide 22 does not rotate, the tilting creates unequal longitudinal tension in tape 12. Upper edge 16 is in greater tension than lower edge 14. As tape 12 moves across guide 22, tape 12 tends to slide downward on guide 22 to reduce the tension in upper edge 16. By tilting guide 22 in an opposite direction, guide 22 places lower edge 14 in greater tension than upper edge 16, thus steering tape 12 upward. In the example in which guide 22 rotates, steering techniques may differ. When tape 12 crosses a rotating guide, tape 12 may not necessarily move in a direction to decrease tension, and may be drawn in some circumstances in a direction that increases tension. Tape 12 may still be steered however by tilting guide 22, but the tilting techniques may be different from the techniques employed when guide 22 is fixed.

The tilting shown in FIG. 2 is for purposes of illustration and is not intended to limit the invention. In FIG. 2, a tilt fulcrum 38, where axes 24 and 24' cross, is depicted near the bottom of guide 24, but fulcrum 38 may be positioned at any other location, including a location other than one coincident with axes 24 or 24'. In addition, actuator 34 can be configured not only to tilt axis 24 of guide 22, but also to translate guide 22 in one, two or three dimensions. For example, actuator 34 can move guide 22 downward, thus steering tape 12 downward. In addition, although FIG. 2 shows only first guide 22, second guide 26 can be configured to move in a similar manner.

Returning to FIG. 1, sensors 30 and 32 are positioned between guides 24, 28 and the reels that dispense or take up tape 12. Sensors 30 and 32 are shown monitoring upper edge 16 of tape 12, but sensors 30 and 32 could also monitor lower edge 14. Additional sensors may also be added, the additional sensors allowing upper edge 16 and lower edge 14 to be monitored simultaneously, for example, or monitoring edge positions between guides 24, 28 and head 18. Sensors 30 and 32 may generate electrical signals indicative of the position of upper edge 16. Sensors 30 and 32 may be optical sensors. Optical sensors offer good sensitivity and high accuracy, i.e., optical sensors are capable of monitoring upper edge 16 position very precisely. Furthermore, optical sensors also provide large bandwidth, i.e., optical sensors respond quickly to rapid changes in tape position. The invention is not limited to optical sensors, however. Sensors 30 and 32 may be other kinds of sensors, such as magnetic sensors configured to sense a magnetic track near the edge of tape 12.

As will be described in more detail below, output signals from sensors 30 and 32 can be used by first guide servo 34 and second guide servo 36 to position first guide 22 and second guide 26. Output signals from sensors 30 and 32 can be also used by head servo 20 to position read/write head 18.

Figure 3:
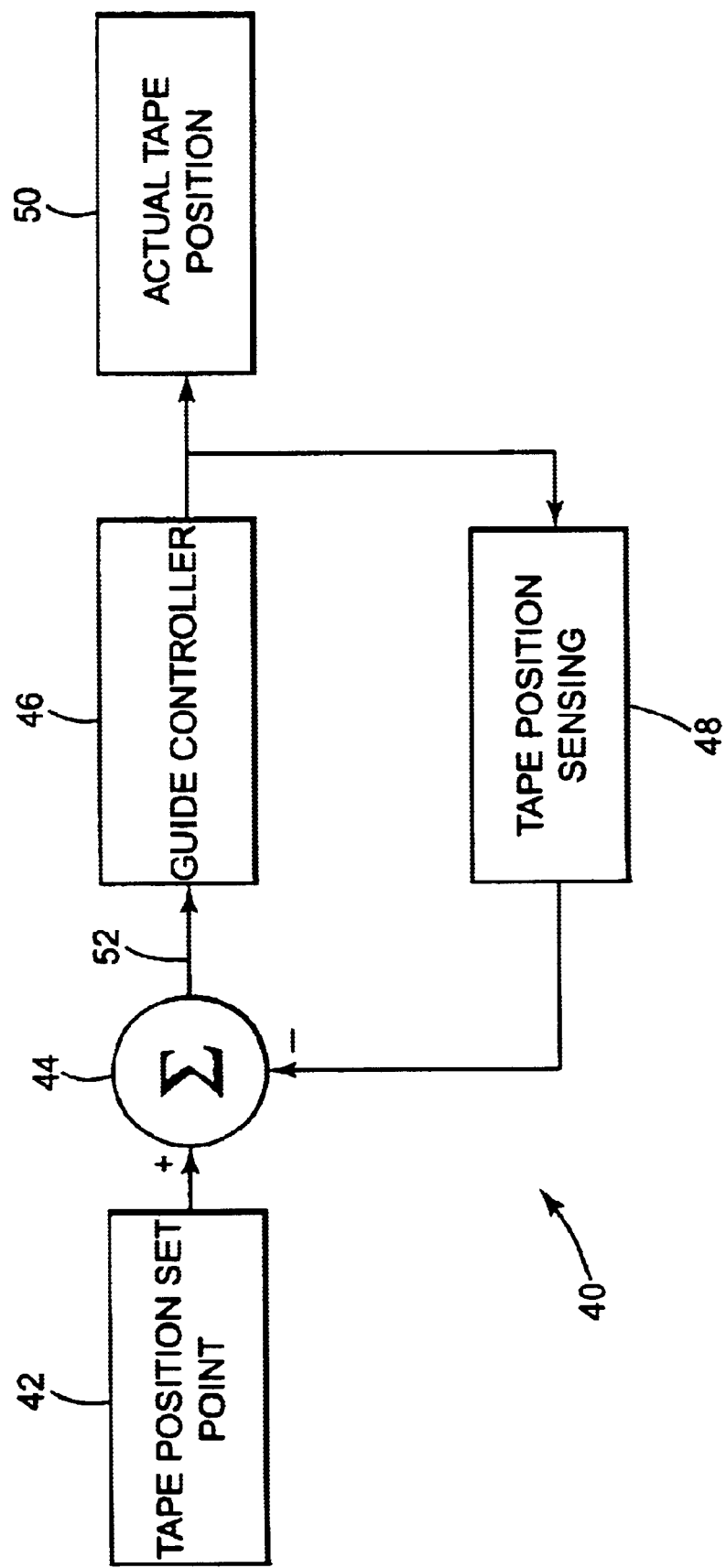
FIG. 3 is a block diagram showing a feedback system.

FIG. 3 is a block diagram illustrating a feedback system 40. For illustrative purposes, it will be assumed that the system applies to edge sensor 30 and guide 22. A tape position set point 42, representing the ideal upper edge 16 position when tape 12 is aligned with the target tape path, is the input to feedback system 40. The actual upper edge 16 position 50 is the output to feedback system 40. The upper edge 16 position is sensed 48 by sensor 30. The actual position 50 is subtracted 44 from the ideal position 42, resulting in an error signal 52. A guide controller that manages guide servo 34 steers tape 12 toward the target position, thus driving the error signal to zero. A similar feedback system may be employed with edge sensor 32 and guide 26.

Figure 4:
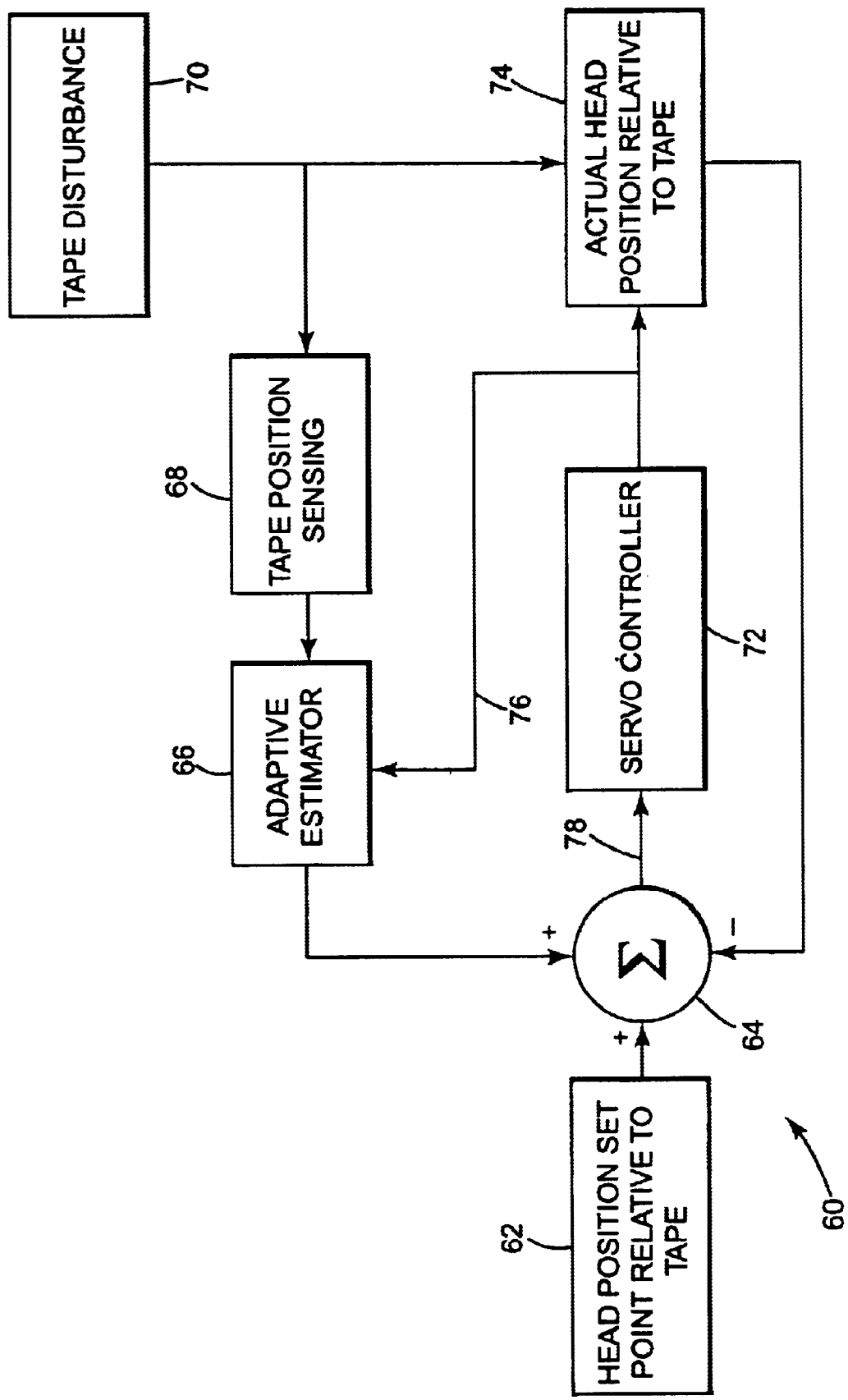
FIG. 4 is a block diagram showing a feedback and feed forward system.

Steering of tape 12 by moving guide 22 or 26 generally cannot change the tape position quickly. For this reason, feedback system 40 tends to be more responsive to low-frequency changes in tape position and less responsive to high-frequency changes. A system that is better able to respond to high-frequency changes is shown in FIG. 4. FIG. 4 is a block diagram illustrating a feedback/feed forward system 60. Feedback/feed forward system 60 uses signals from sensors 30 and 32 to correct for read/write head 18 position errors and to anticipate movement of tape 12. Although feedback/feed forward system 60 uses some common components as feedback system 40, such as sensors 30 and 32, the two systems 40 and 60 are shown as separate block diagrams for clarity.

Input to feedback/feed forward system 60 is the desired position of head 18 (62), relative to a point on tape 12. The desired position of head 18 may be specified, for example, with respect to a particular data track or a particular servo track. Servo controller 72 places head 16 at a position relative to the tape (74). The actual head position relative to tape 12 (74) is negatively fed back (64) to correct for errors in the position of head 18. The actual position (74), subtracted (64) from the desired position (62), produces an error signal (78), which is used by servo controller 72.

Tape disturbance 70, such as a high-frequency tape lateral motion, may affect the position of the head 18 with respect to tape 12 (74). Tape disturbance 70 also affects the position of tape 12 as detected by sensor 30 or 32 (68). Because many disturbances 70 are detected by sensors 30 or 32 before they reach head 18, an adaptive estimator (66) may use sensor 68 signals to feed forward (64) signals to servo controller 72 to anticipate impending motion caused by tape disturbance 70. As a result, servo controller 72 can position head 18 quickly when the disturbance reached head 18, and can wholly or partially compensate for the disturbance when the disturbance reaches head 18.

Adaptive estimator 66 may include, e.g., a differentiator to convert position signals from a sensor 68 to signals indicative of the velocity of tape movement. Adaptive estimator 66 may further include instructions or logic for recognizing tape disturbances caused by head 18 itself. For example, adaptive estimator may correlate tape position 68 with signals 76 from servo controller 72 to recognize cases in which friction between head 18 and tape 12 causes tape 12 to adhere to head 18 and follow head 18. In such a case, adaptive estimator 66 may feed forward signals to counteract the feedback signals, thus keeping head 18 stationary. The advantage of counteracting is that it prevents head 18 from trying to pursue a track on tape 12 that friction prevents head 18 from reaching.

Although feedback system 40 and feedback/feed forward system 60 have been described separately above, and although systems 40 and 60 may operate alone or independently, it is usually advantageous for systems 40 and 60 to cooperate with each other. Cooperation allows improved compensation for high-frequency changes and low-frequency changes in tape position. For example, feedback system 40 may send a signal to feedback/feed forward system 60 that shows that feedback system 40 is steering tape 12 downward. Feedback/feed forward system 60 may use that signal to adjust the head position to follow the downward motion of tape 12.

A number of embodiments of the invention have been described. These and other embodiments are within the scope of the following claims.

What is claimed is:

1. A system for dynamically positioning data recording tape comprising:
   a sensor that detects an actual position of the tape;
   a guide that interacts with the tape; and
   a controller that dynamically moves the guide as a function of a comparison of the actual position of the tape with an ideal position of the tape.

2. The system of claim 1, wherein the data recording tape is magnetic tape.

3. The system of claim 1, wherein the sensor is an optical sensor.

4. The system of claim 1, wherein the sensor is a magnetic sensor.

5. The system of claim 1, wherein the guide is configured to steer the tape.

6. The system of claim 1, wherein the guide is configured to tilt, the controller tilting the guide as a function of the position signal.

7. The system of claim 1, wherein the tape is housed in a tape cartridge and the guide is mounted on a baseplate in the tape cartridge.

8. The system of claim 1, wherein the tape is housed in a tape cartridge inserted into a tape drive, the guide being mounted on a deck within the tape drive.

9. The system of claim 1, wherein the controller is in the tape drive.

10. The system of claim 1 further comprising an actuator coupled to the controller, the actuator configured to move the guide.

11. A system for dynamically positioning a head for reading and writing to data recording tape, the system comprising:
    a head;
    a sensor configured to detect an actual position of the head relative to an actual position of the tape;
    a servo coupled to the head, wherein the servo is configured to dynamically move the head as a function of a comparison of the actual position of the head relative to the tape with an ideal position of the head relative to the tape.

12. The system of claim 11, wherein the data recording tape is magnetic tape.

13. The system of claim 11, wherein the sensor is configured to detect the position of the tape by detecting the position of an edge of the tape.

14. The system of claim 11, wherein the sensor is an optical sensor.

15. The system of claim 11, wherein the sensor is a magnetic sensor.

16. The system of claim 11, wherein the sensor is positioned to detect the position of the tape at a point before the tape passes the head.

17. The system of claim 11 further comprising an adaptive estimator configured to receive an actual position of the tape and to generate there from a tape disturbance signal, wherein the servo is configured to dynamically move the head in anticipation of the tape disturbance.

18. The system of claim 17, wherein the adaptive estimator includes a differentiator.

19. The system of claim 11, wherein the sensor is a first sensor, the system further comprising a second sensor, wherein the first sensor and the second sensor are positioned to detect the position of the tape at points on opposite sides of the head.

20. The system of claim 11, wherein the sensor is a first sensor, the system further comprising a second sensor, wherein the first sensor is positioned to detect the top edge of the tape and the second sensor is positioned to detect the bottom edge of the tape.

21. A method comprising:

passing data recording tape over a guide;

sensing the actual position of the tape; and dynamically moving the guide as a function of a comparison of the actual position of the tape with an ideal position of the tape.

22. The method of claim 21 wherein moving the guide comprises steering the tape.

23. The method of claim 22 further comprising:

setting a target tape path for the tape; and moving the guide to steer the tape to the target tape path.

24. The method of claim 21, wherein sensing the actual position of the tape comprises sensing the position of an edge of the tape.

25. A method comprising:

detecting a disturbance in the path of data recording tape, wherein the disturbance is detected before the disturbance reaches a head;

generating a signal as a function of the disturbance;

dynamically moving the head as a function of the signal.

26. The method of claim 25 further comprising sensing the velocity of the tape.

27. The method of claim 25, wherein the signal is a first signal, the method further comprising:

predicting tape position at the head as a function of the first signal;

generating a second signal as a function of the prediction; and moving the the head as a function of the second signal.

28. A system comprising:

a sensor that detects an actual position of data recording tape;

a guide that interacts with the tape;

a first controller that moves the guide as a function of a comparison of the actual position of the data recording tape and an ideal position of the data recording tape;

a head;

a second controller that moves the head as a function of a comparison of the actual position of the data recording tape and an ideal position of the head with respect to the data recording tape;

the sensor further configured to detect a tape disturbance before the tape disturbance reaches the head; and an adaptive estimator configured receive the sensed tape disturbance and to control movement of the head in anticipation of the sensed tape disturbance.

29. The system of claim 28 further comprising an actuator coupled to the first controller, the actuator configured to move the guide.

30. The system of claim 28 further comprising a servo coupled to the second controller, the servo configured to move the head.

31. The system of claim 28 wherein the first controller is coupled to the second controller.

32. The system of claim 31 wherein the first controller generates a first signal, and wherein the second controller moves the head as a function of the first signal.

33. The system of claim 31 wherein the second controller generates a second signal, and wherein the first controller moves the guide as a function of the second signal.

34. A method comprising:

passing data recording tape over a guide;

passing the data recording tape past a head;

sensing an actual position of the tape;

moving the guide as a function of a comparison of the actual position of the tape and an ideal position of the tape;

moving the head as a function of an actual position of the head with respect to the tape and an ideal position of the head with respect to the tape;

detecting a tape disturbance before the tape disturbance reaches the head; and moving the head in anticipation of the sensed tape disturbance.

35. The method of claim 34 further comprising:

generating a first signal, indicative of the actual position of the head with respect to the tape, as a function of the actual position of the tape; and moving the head as a function of the first signal.

36. The method of claim 34 further comprising:

generating a second signal as a function of the actual position of the tape; and moving the guide as a function of the second signal.

* * * * *